United States Patent
Sakurai

(10) Patent No.: US 12,457,053 B2
(45) Date of Patent: Oct. 28, 2025

(54) OPTICAL TRANSMISSION SYSTEM

(71) Applicant: SANTEC HOLDINGS CORPORATION, Komaki (JP)

(72) Inventor: Yasuki Sakurai, Komaki (JP)

(73) Assignee: SANTEC HOLDINGS CORPORATION, Aichi (JP)

( * ) Notice: Subject to any disclaimer, the term of this patent is extended or adjusted under 35 U.S.C. 154(b) by 0 days.

(21) Appl. No.: 18/279,613

(22) PCT Filed: Aug. 3, 2022

(86) PCT No.: PCT/JP2022/029809
§ 371 (c)(1),
(2) Date: Aug. 31, 2023

(87) PCT Pub. No.: WO2024/029006
PCT Pub. Date: Feb. 8, 2024

(65) Prior Publication Data
US 2025/0015918 A1    Jan. 9, 2025

(51) Int. Cl.
*G02B 6/293* (2006.01)
*H04J 14/02* (2006.01)

(52) U.S. Cl.
CPC .............. *H04J 14/02* (2013.01); *G02B 6/293* (2013.01)

(58) Field of Classification Search
CPC ................................................ G02B 6/29311
See application file for complete search history.

(56) References Cited

U.S. PATENT DOCUMENTS

| | | | |
|---|---|---|---|
| 6,072,927 A | | 6/2000 | Iwashima et al. |
| 7,386,204 B1 * | | 6/2008 | Davis ................. G02B 6/29395 |
| | | | 385/37 |
| 2003/0179988 A1 | | 9/2003 | Kai et al. |
| 2008/0085119 A1 | | 4/2008 | Ye et al. |
| 2013/0088656 A1 | | 4/2013 | Michihata et al. |

(Continued)

FOREIGN PATENT DOCUMENTS

| | | |
|---|---|---|
| JP | 2008203508 A | 9/2008 |
| JP | 2009-9073 A | 1/2009 |
| JP | 2011-065023 A | 3/2011 |

OTHER PUBLICATIONS

Written Opinion of the International Searching Authority dated Nov. 1, 2022, Application No. PCT/JP2022/029809.

(Continued)

*Primary Examiner* — Shi K Li
(74) *Attorney, Agent, or Firm* — Meunier Carlin & Curfman LLC

(57) ABSTRACT

An optical filter is configured to selectively pass, as an output light, at least one wavelength component of multiple wavelength components included in an input light. The optical filter comprises a movable element. A controller is configured to adjust a passband by controlling the movable element based on power of light corresponding to the output light measured by a power monitor. The optical filter is configured as a filter so that in a first wavelength band including a center wavelength of the passband, a gain curve corresponds to a convex function having a peak at the center wavelength and in a second wavelength band adjacent to the first wavelength band, the gain curve shows a stepper slope than the convex function.

19 Claims, 12 Drawing Sheets

(56) References Cited

U.S. PATENT DOCUMENTS

| | | | |
|---|---|---|---|
| 2017/0093515 A1 | 3/2017 | Tanaka et al. | |
| 2020/0003957 A1* | 1/2020 | Hasegawa | G02B 6/262 |
| 2020/0249399 A1* | 8/2020 | Sakurai | G02B 6/3512 |

OTHER PUBLICATIONS

International Search Report and Written Opinion in Application No. PCT/JP2022/029809, dated Aug. 3, 2022, 9 pages.

* cited by examiner

OPTICAL TRANSMISSION SYSTEM

CROSS-REFERENCE TO RELATED APPLICATION

This application is a national stage application filed under U.S.C. § 371 of International Application No. PCT/JP2022/029809, filed Aug. 3, 2022, which is hereby incorporated by reference in its entirety.

TECHNICAL FIELD

The present disclosure relates to an optical transmission system.

BACKGROUND ART

Conventionally, optical communication networks using a wavelength division multiplex (WDM) optical communication technique have been known. In the optical communication network, an optical amplifier is arranged to compensate for the transmission loss of an optical fiber. Examples of the optical amplifier, which has been known, may include an erbium-doped optical fiber amplifier.

In the optical amplifier, an ASE (Amplified Spontaneous Emission) noise is added to an optical signal when the optical signal is amplified. Therefore, in the optical communication network, a wavelength tunable filter is arranged to remove the ASE noise.

Well-known wavelength tunable filters may include diffraction gratings (e.g., see Patent Documents 1 and 2). Such wavelength tunable filter is configured to reflect, by a mirror, an input light dispersed by the diffraction grating so that only specific wavelength components included in the input light are optically coupled to an output optical fiber. The mirror is configured such that its mirror surface is angle-adjustable. The angular adjustment of the mirror surface allows to change a wavelength band to be optically coupled to the output optical fiber.

In addition, there has been a known technique in which power of light that passed a wavelength tunable filter is measured by a power monitor to control a passband of the wavelength tunable filter based on the measured power (e.g., see Patent Document 3).

The passband of the wavelength tunable filter may vary due to the temperature, and gradually varies over time due to the external environment. Therefore, the power of the light that passed the wavelength tunable filter is measured by the power monitor, and the angle of the mirror surface is adjusted based on the measured power.

For example, the angle of the mirror surface in the wavelength tunable filter is adjusted so that the power measured by the power monitor is maximized. With this adjustment, the passband of the wavelength tunable filter is adjusted so that the center thereof is aligned with the center wavelength of the optical signal.

PRIOR ART DOCUMENTS

Patent Documents

Patent Document 1: U.S. Patent Publication No. 2008/0085119
Patent Document 2: Japanese Unexamined Patent Application Publication No. 2008-203508
Patent Document 3: Japanese Unexamined Patent Application Publication No. 2017-063293

SUMMARY OF THE INVENTION

Problems to be Solved by the Invention

In the optical communication network, in order to improve data traffic congestion, it has been demanded to enhance frequency utilization efficiency. In a large capacity network based on the WDM technology in which optical signals having different wavelengths are transmitted through one optical fiber, it is important that the optical signals can be densely arranged on a frequency axis.

In a 400 Gbps/wavelength WDM network with 100 GHz spacing, a 400 Gbps signal that has been multi-level modulated at 64 Gbound occupies almost the same bandwidth of 64 GHz on the frequency axis. When this signal is amplified by an optical amplifier and transmitted, an ASE noise is generated in an adjacent channel. The wavelength tunable filter is provided downstream of the optical amplifier to remove the ASE noise and improve the signal-to-noise ratio of the WDM signal.

Widely used wavelength tunable filters are those with an amplitude-frequency characteristic of a Gaussian shape, i.e., insertion loss characteristic of a Gaussian shape. However, in this type of filter, a slope of a gain curve, i.e., an insertion loss curve is gentle. Therefore, it is difficult, by use of the filter, to greatly attenuate the ASE noise of the adjacent channels located 100 GHz apart on the frequency axis while passing the WDM signals that occupy the bandwidth of 64 GHz.

On the other hand, if the wavelength tunable filter is provided with an amplitude-frequency characteristic of a rectangular shape, the noise outside the passband can be greatly attenuated. However, in this case, the curve in the passband is flat. Thus, even if the passband is shifted around the center wavelength of the optical signal, there is no significant change in power measured by a power monitor. Therefore, it is difficult to precisely align the center of the passband with the central wavelength of the optical signal based on the power.

According to one aspect of the present disclosure, it is preferable to provide a technology that allows to significantly attenuate the noise outside the passband and appropriately control the passband in an optical transmission system.

Means for Solving the Problems

An optical transmission system according to one aspect of the present disclosure comprises an optical filter and a controller. The optical filter is configured to selectively pass, as an output light, at least one wavelength component of multiple wavelength components included in an input light.

The optical filter comprises a movable element to change a passband. The controller is configured to adjust the passband by controlling the movable element based on power of light corresponding to the output light measured by a power monitor.

According to one aspect of the present disclosure, the optical filter is configured as a bandpass filter having a first amplitude-frequency characteristic in the first wavelength band. The first wavelength band includes a center wavelength of the passband. The first amplitude-frequency characteristic is that a gain curve corresponds to a convex function having a peak at the center wavelength in the first wavelength band. The convex function may be defined by a Gaussian function or a super Gaussian function.

According to one aspect of the present disclosure, the optical filter is configured as a bandpass filter having a second amplitude-frequency characteristic in a second wavelength band. The second wavelength band is adjacent to the first wavelength band and is more away from the center wavelength than the first wavelength band. In the second wavelength band, the second amplitude-frequency characteristic is that the gain curve shows a steeper slope than the above-described convex function.

By configuring the optical filter to have the above-described frequency characteristics, it is possible to increase the noise attenuation outside the passband while reducing the signal attenuation in the passband. That is, it is possible to effectively reduce the noise outside the passband from a wavelength band near the passband.

Furthermore, according to this optical transmission system, the frequency characteristic in the passband is convex. Thus, a difference between the center of the passband and the signal center caused by the change of the passband is likely to appear in a change in power measured by the power monitor. Thus, it is possible to accurately perform a control to adjust the center wavelength of the passband to the center wavelength of the optical signal.

According to one aspect of the present disclosure, the controller may be configured to control the movable element so that the center wavelength of the passband is adjusted to a center wavelength of a signal component included in the input light by controlling the movable element so that the power shows a peak. According to the optical transmission system comprising such a control of the movable element, the center wavelength of the passband can be accurately adjusted to the center wavelength of the optical signal.

According to one aspect of the present disclosure, the optical filter may have an amplitude-frequency characteristic in which the gain curve corresponds to the Gaussian function or a super Gaussian function of order 1 or more and less than 3 in the first wavelength band.

According to one aspect of the present disclosure, the optical filter may have an amplitude-frequency characteristic in which the gain curve corresponds to a super Gaussian function of order 3 or more in the second wavelength band.

In this way, the slope of the gain curve is different in the first wavelength band and the second wavelength band. Therefore, the noise outside the passband can be effectively reduced from the wavelength band near the passband.

According to one aspect of the present disclosure, the optical filter may comprise a transmission grating and a reflecting mirror in addition to the movable element. The transmission grating may be arranged in the propagation path of the input light. The reflecting mirror may have a reflective surface.

The reflecting mirror may be configured to reflect, as the output light, wavelength components incident on the reflective surface under a given angular condition among dispersed multiple wavelength components of the input light included in transmitted diffraction light from the transmission grating. The movable element may be configured to change the passband by changing propagation paths of the dispersed multiple wavelength components relative to the reflective surface under a control of the controller.

According to one aspect of the present disclosure, the movable element may be a tilting mirror. The tilting mirror may be configured to change wavelength components to be incident on the reflective surface of the reflecting mirror among the dispersed multiple wavelength components by changing an angle of a mirror surface to reflect the transmitted diffraction light from the transmission grating toward the reflecting mirror.

According to one aspect of the present disclosure, between the reflecting mirror and the transmission grating, a telecentric optical system may be arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis.

According to one aspect of the present disclosure, in the optical transmission system comprising the telecentric optical system, the reflective mirror may include a reflective surface that has a convex shape with a vertex at a point on which a wavelength component corresponding to the center wavelength of the passband is incident and that is shaped so that the optical filter has the first amplitude-frequency characteristic and the second amplitude-frequency characteristic. Such shaping of the reflective surface may impart the above-described frequency characteristics to the optical filter.

According to one aspect of the present disclosure, in the optical transmission system comprising the telecentric optical system, the reflective mirror may include a reflective surface whose reflectance distribution is characterized so that the optical filter has the first amplitude-frequency characteristic and the second amplitude-frequency characteristic. Such feature of the reflectance distribution may impart the above-described frequency characteristics to the optical filter.

According to one aspect of the present disclosure, between the reflecting mirror and the transmission grating, a lens is arranged to adjust a direction of propagation of each of the multiple wavelength components included in the transmitted diffraction light propagated from the transmission grating toward the reflecting mirror.

In this case, the lens may be arranged to generate an aberration in which a direction of propagation of a wavelength component in a wavelength band more away from the center wavelength of the passband is more inclined relative to an optical axis so that the optical filter has the first amplitude-frequency characteristic and the second amplitude-frequency characteristic. The use of such aberration may impart the above-described frequency characteristics to the optical filter.

According to one aspect of the present disclosure, between the reflecting mirror and the transmission grating, a lens may be arranged to adjust a focal distance of each of the multiple wavelength components included in the transmitted diffraction light propagated from the transmission grating toward the reflecting mirror.

In this case, the lens may be arranged to generate an aberration in which a wavelength component in a wavelength band more away from the center wavelength of the passband has a focal point more away from the reflective surface so that the optical filter has the first amplitude-frequency characteristic and the second amplitude-frequency characteristic. The use of such aberration may impart the above-described frequency characteristics to the optical filter.

EXPLANATION OF REFERENCE NUMERALS

1 . . . optical transmission system, 10 . . . optical amplifier, 30 . . . wavelength tunable filter, 31 . . . optical input/output portion, 33 . . . collimator, 35 . . . transmission grating, 37, 371, 373 . . . lens, 39, 391, 393 . . . reflecting mirror, 39A, 391A, 393A . . . reflection surface, 40 . . . tilting mirror, 40A . . . mirror surface, 60 . . . power monitor, 70 . . . controller

MODE FOR CARRYING OUT THE INVENTION

Some example embodiments of the present disclosure will be described with reference to the drawings.

(1) Main Embodiment

Figure 1:
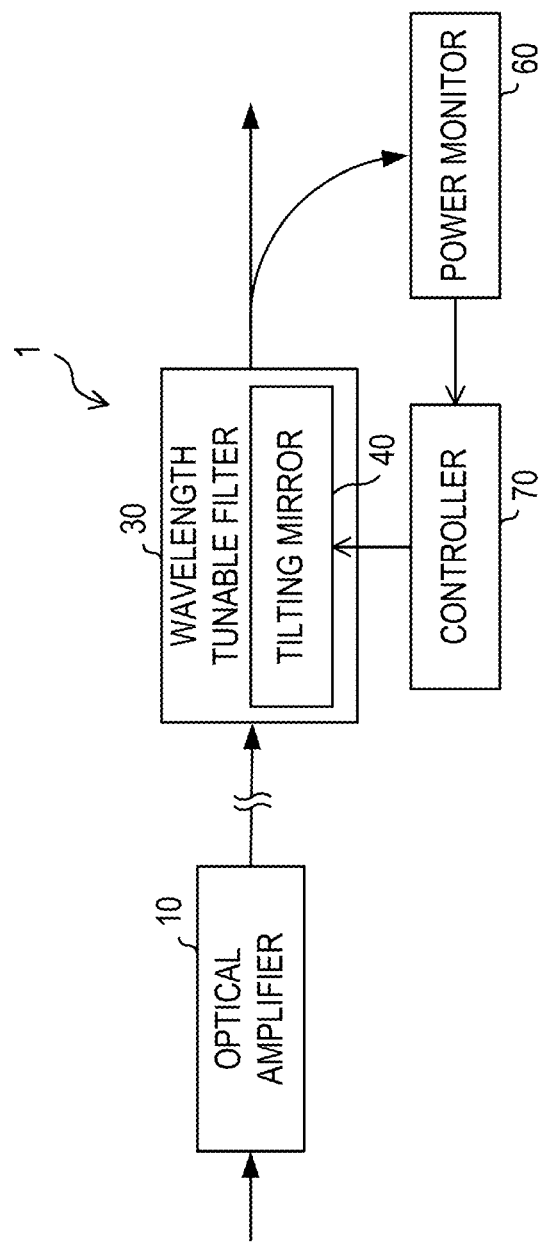
FIG. 1 is a block diagram showing a structure of an optical transmission system.

The optical transmission system 1 of this embodiment shown in FIG. 1 is configured to amplify an optical signal in WDM network by an optical amplifier 10, and transmit it downstream.

This optical transmission system 1 comprises a wavelength tunable filter 30 as an optical filter arranged downstream of the optical amplifier 10 in order to remove an ASE noise added to the optical signal at the time of amplification by the optical amplifier 10.

The wavelength tunable filter 30 comprises a tilting mirror 40 as a movable element. The wavelength tunable filter 30 can change a passband by changing an angle of a mirror surface 40A of the tilting mirror 40.

The optical transmission system 1 further comprises a power monitor 60 and a controller 70 as components to control the passband of the wavelength tunable filter 30. The power monitor 60 is arranged downstream of the wavelength tunable filter 30. The light passed through the wavelength tunable filter 30 is branched and input to the power monitor 60.

The power monitor 60 measures the power of the light passed through the wavelength tunable filter 30 based on the input branched light. The measurement signal of the power by the power monitor 60 is input into the controller 70.

The controller 70 is configured to control the passband of the wavelength tunable filter 30 by controlling the tilting mirror 40. Specifically, the controller 70 controls the angle of the mirror surface 40A of the tilting mirror 40 based on the measurement signal from the power monitor 60 so that the center of the passband of the wavelength tunable filter 30 is aligned with a center wavelength of the optical signal to be transmitted.

Even if the mirror surface 40A of the tilting mirror 40 is fixed, the passband of the wavelength tunable filter 30 is slightly changed due to environmental factors such as temperature. That is, even after the center of the passband is aligned with the center wavelength of the optical signal, the center of the passband is gradually shifted from the center wavelength of the optical signal if no angular adjustment is made to the mirror surface 40A.

The controller 70 is configured to control the tilting mirror 40 in order to correct this misalignment. Specifically, the controller 70 is configured to control the angle of the mirror surface 40A so that the power measured by the power monitor 60 shows a peak. The passband of the wavelength tunable filter 30 is thereby adjusted so that the center thereof is aligned with the center wavelength of the optical signal that is a main component of the light input into the wavelength tunable filter 30.

Figure 2:
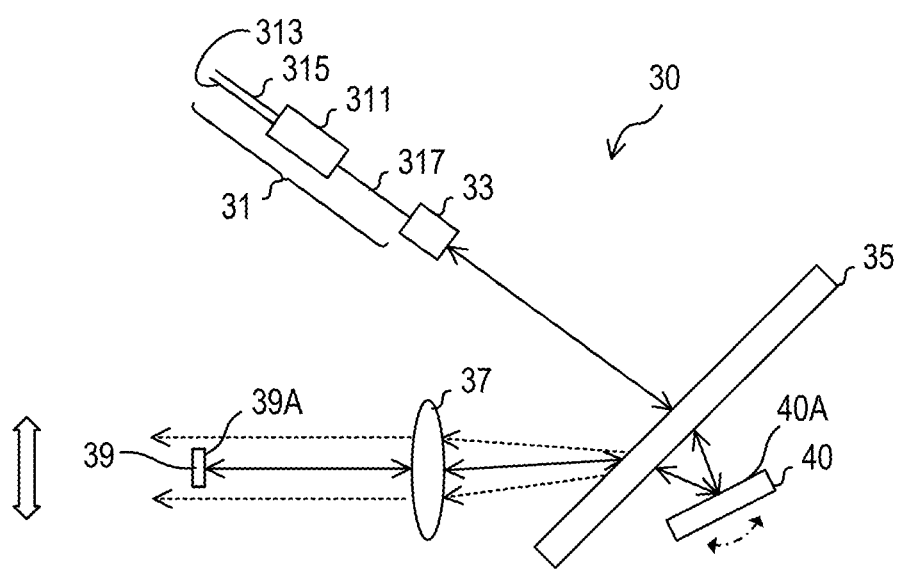
FIG. 2 shows a configuration of a wavelength tunable filter.

FIG. 2 illustrates an exemplary configuration of the wavelength tunable filter 30. This wavelength tunable filter 30 further comprises an optical input/output portion 31, a collimator 33, a transmission grating 35, a lens 37 and a reflecting mirror 39.

The optical input/output portion 31 comprises an optical circulator 311 and an input optical fiber 313, output optical fiber 315, and internal optical fiber 317 connected to the optical circulator 311. The light from the optical amplifier 10 is input into the wavelength tunable filter 30 through the input optical fiber 313.

The input light, which is input into the wavelength tunable filter 30 through the input optical fiber 313, is transmitted to the internal optical fiber 317 through the optical circulator 311. The collimator 33 is arranged at the end of the internal optical fiber 317. The input light is collimated by the collimator 33, and then, propagated to the transmission grating 35.

The transmission grating 35 is provided in a propagation path of the collimated input light. The angle of diffraction of the transmission grating 35 depends on a wavelength of an incident light. Based on this wavelength dependence, the transmission grating 35 is configured to spatially separate the collimated input light into multiple wavelength components. The input light from the collimator 33 passes through the transmission grating 35, and travels to the tilting mirror 40 as a transmitted diffraction light with the multiple wavelength components spatially dispersed.

The transmitted diffraction light propagated to the tilting mirror 40 is reflected on the mirror surface 40A of the tilting mirror 40 and passes through the transmission grating 35 again. The transmitted diffraction light, which passed through the transmission grating 35 again, travels to a reflecting mirror 39 side through the lens 37 with the multiple wavelength components spatially dispersed.

The solid arrow shown in FIG. 2 schematically shows the propagation of the optical signal in which the center of the passband is adjusted to the center wavelength of the optical signal. The dotted arrow shown in FIG. 2 schematically shows the propagation of noise components outside the passband.

The tilting mirror 40 is configured to change the angle of the mirror surface 40A under the control by the controller 70. The tilting mirror 40 is an MEMS mirror, for example. The dash-dotted arrow in FIG. 2 shows that the angle of the mirror surface 40A of the tilting mirror 40 is changed due to a rotation. The thick arrow in FIG. 2 shows that a relative position of the transmitted diffraction light relative to the reflecting mirror 39, the light being propagated to the reflecting mirror 39, varies in a direction parallel to the reflective surface 39A of the reflecting mirror 39 due to the change in the angle of the mirror surface 40A.

Figure 3A:
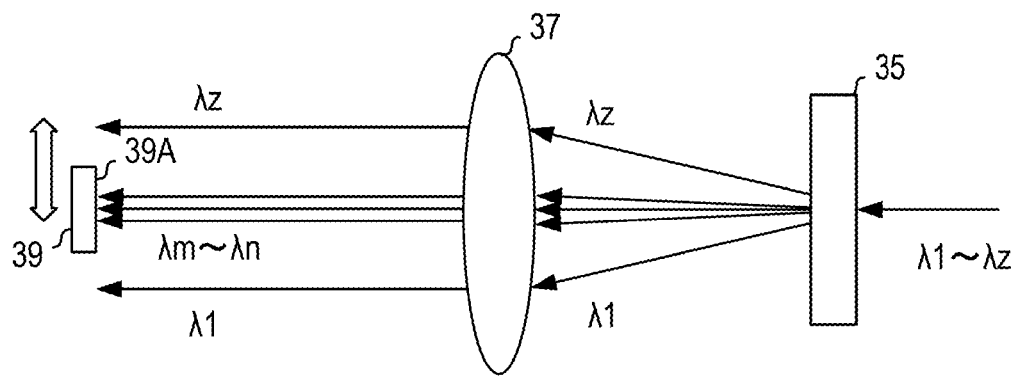
FIG. 3A illustrates a telecentric optical system between a transmission grating and a reflecting mirror.

The lens 37 is a telecentric lens. As shown in FIG. 3A, the lens 37 converts the transmitted diffraction light from the transmission grating 35, or more specifically, each of the multiple wavelength components spatially dispersed in the transmitted diffraction light, into a ray such that the direction of propagation thereof is parallel to the optical axis passing through the center of the lens 37.

The reflecting mirror 39 is arranged so that the center of the flat reflective surface 39A is placed on the optical axis passing through the center of the lens 37. The reflecting mirror 39 is arranged so that a normal line from the center of the reflective surface 39A is aligned with the optical axis and the reflective surface 39A is placed in the focus position of the lens 37 as shown in FIG. 3B.

Figure 3B:
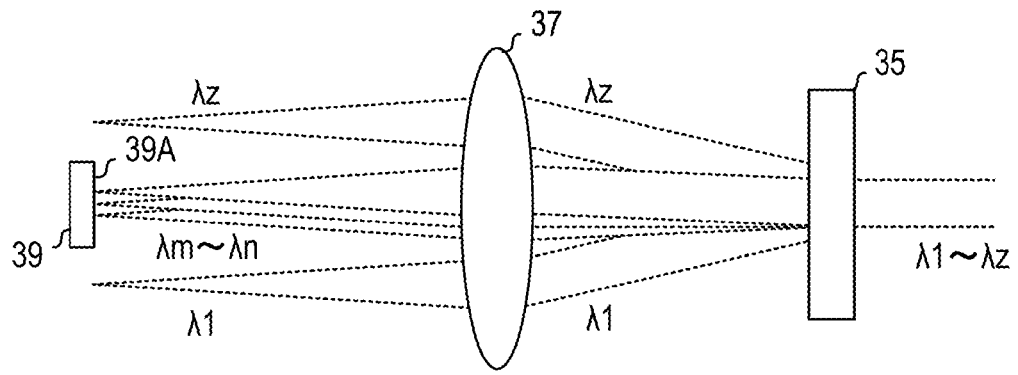
FIG. 3B illustrates a focus position of light incident on the reflecting mirror.

FIG. 2, FIG. 3A and FIG. 3B show the configurations of the same wavelength tunable filter 30. In FIGS. 3A and 3B, the layout of the transmission grating 35, the lens 37, and the reflecting mirror 39 is schematically and simply illustrated in order to explain the direction of propagation and focus position of the light. In FIG. 3B, the dashed line corresponds to a ray per a wavelength. FIG. 3B illustrates that the focus position of the ray incident on the reflecting mirror 39 is on the reflective surface 39A.

That is, the lens 37 constitutes a telecentric optical system between the transmission grating 35 and the reflecting mirror 39 to focus the transmitted diffraction light from the transmission grating 35 on the reflecting mirror 39. The lens 37 adjusts the directions of propagation of the multiple wavelength components included in the transmitted diffraction light so that the directions of propagation are perpendicular to the reflective surface 39A of the reflecting mirror 39.

As mentioned above, the transmitted diffraction light from the transmission grating 35 is in a state where the multiple wavelength components included in the input light are spatially dispersed. However, the reflective surface 39A of the reflecting mirror 39 is smaller relative to the spatial spreading of the multiple wavelength components included in the input light.

Therefore, some wavelength components of the multiple wavelength components included in the input light are selectively incident on the reflective surface 39A, in accordance with the angle of the mirror surface 40A of the tilting mirror 40. Specifically, these wavelength components are selectively incident on the reflective surface 39A so that a wavelength component corresponding to the center of the passband is incident from a direction perpendicular to the reflective surface 39A on the center of the reflective surface 39A corresponding to the optical axis passing through the center of the lens 37, and focused on the reflective surface 39A.

The reflecting mirror 39 selectively reflects, among the multiple wavelength components spatially dispersed, the above-described wavelength components perpendicularly incident on the reflective surface 39A as wavelength components incident on the reflective surface 39A under a certain angular condition.

FIGS. 3A and 3B show that, among the wavelength components of wavelength $\lambda 1$ to wavelength $\lambda z$ included in the input light, the wavelength components of wavelength $\lambda m$ to wavelength $\lambda n$ are incident on the reflective surface 39A of the reflecting mirror 39, and other wavelength components travel off the reflective surface 39A.

The output light reflected by the reflecting mirror 39 travels back in the opposite direction on its outward path to the reflecting mirror 39 and travels through the collimator 33 to reach the optical circulator 311. The output light reached the optical circulator 311 travels downstream of the optical transmission system 1 through the output optical fiber 315.

According to the above-described configuration, in the wavelength tunable filter 30, some wavelength components, among the multiple wavelength components included in the input light, are selectively connected to the output optical fiber 315 and transmitted downstream as an output light from the output optical fiber 315.

The angle of the mirror surface 40A of the tilting mirror 40 is controlled by the controller. This causes the relative propagation path, i.e., relative position of each of the wavelength components relative to the reflective surface 39A of the reflecting mirror 39 to vary in the thick arrow direction shown in FIGS. 2 and 3A, whereby the passband of the wavelength tunable filter 30 is adjusted so as to slide on a frequency axis.

Figure 4:
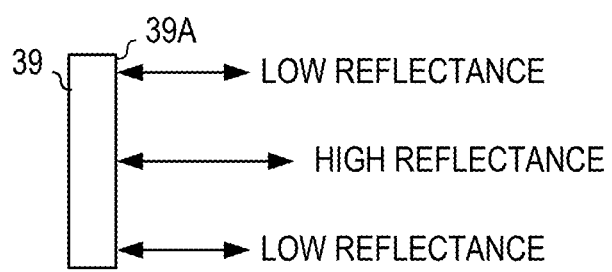
FIG. 4 illustrates a reflectance distribution in the reflecting mirror.

Characteristically, in this embodiment, the reflective surface 39A of the reflecting mirror 39 does not have a uniform reflectance throughout its entirety and has a non-uniform reflectance distribution as shown in FIG. 4.

Specifically, the reflective surface 39A has a reflectance distribution in which the reflectance gradually decreases from the center of the reflective surface 39A, on which the light having the wavelength corresponding to the center of the passband incident, toward a direction of wavelength dispersion dispersed by the transmission grating 35. This reflectance distribution is determined and provided to the reflecting mirror 39 so that the wavelength tunable filter 30 exhibits an insertion loss characteristic, i.e. a gain characteristic of the input light shown in FIG. 5.

Figure 5:
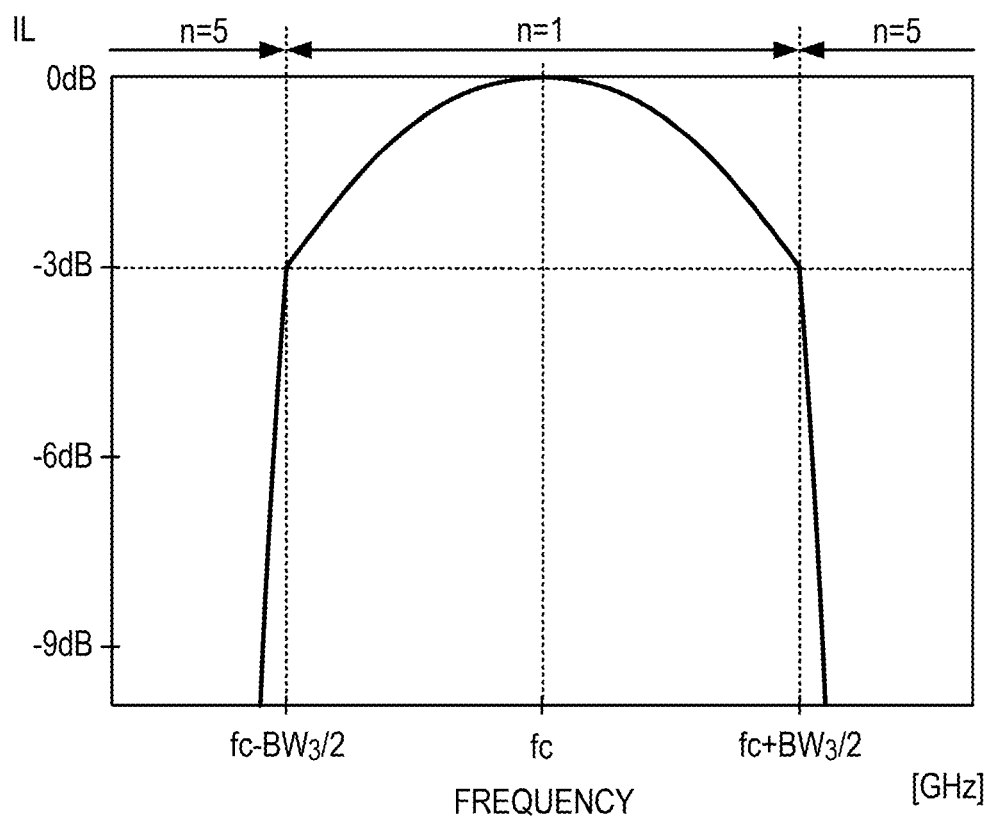
FIG. 5 is a graph showing insertion loss characteristics of the wavelength tunable filter.

The graph of the insertion loss characteristic shown in FIG. 5 comprises a horizontal axis representing the frequency and a vertical axis representing an insertion loss (IL), i.e., a gain. The wavelength tunable filter 30 is configured as a bandpass filter having a convex-shaped insertion loss characteristic corresponding to a combination of two or more super Gaussian functions of different orders, as shown in the figure.

The wavelength tunable filter 30 shows the insertion loss of 0 dB (decibel) at the center frequency fc of the passband. In a first wavelength band around the center frequency fc, the wavelength tunable filter 30 has the convex-shaped insertion loss characteristic in accordance with the insertion loss curve defined by a super Gaussian function of order n=1 with a peak at the center frequency fc.

In a second wavelength band adjacent to the first wavelength band at both ends of the first wavelength band, the wavelength tunable filter 30 has an insertion loss characteristic in accordance with an insertion loss curve defined by a super Gaussian function of order n=5 with a peak at the center frequency fc. The insertion loss curve corresponds to a gain curve, and the insertion loss characteristic corresponds to the amplitude-frequency characteristic of the wavelength tunable filter 30.

The insertion loss curve defined by the super Gaussian function of order n is represented by the following formula. In the following formula, fc means the center frequency, Av means a frequency difference from the center frequency fc, and $BW_3$ means a bandwidth of −3 dB.

$$IL[dB] = 10 \cdot \log\left[\exp\left(-\ln(2) \cdot \left(\frac{2 \cdot \Delta v}{BW_3}\right)^{2n}\right)\right] + fc \quad \text{[Formula 1]}$$

Figure 6:
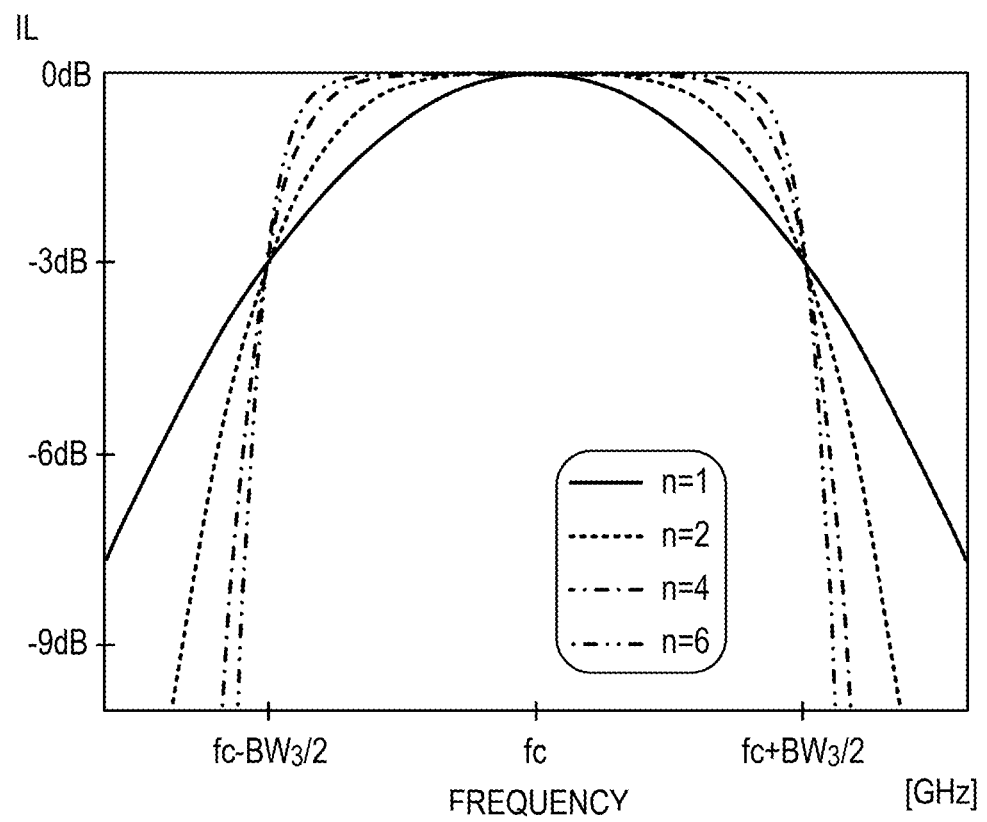
FIG. 6 is a graph showing insertion loss curves defined by super Gaussian functions.

FIG. 6 shows insertion loss curves defined by super Gaussian functions of order n=1, 2, 4, and 6. FIG. 6 shows an insertion loss curve of order n=1 in a solid line, an insertion loss curve of order n=2 in a dashed line, an insertion loss curve of order n=4 in a dash-dotted line, and an insertion loss curve of order n=6 in a dashed double-dotted line.

The conventional wavelength tunable filter has a Gaussian-shaped insertion loss characteristic, and its insertion loss curves follow a Gaussian function or the super Gaussian function of order n=1. As can be seen from FIG. 6, the insertion loss curves following the super Gaussian functions show features in which the higher the order n is, the flatter the curves are around the center frequency fc, and the more separate from the center frequency fc, the steeper the insertion loss slopes are.

Figure 12:
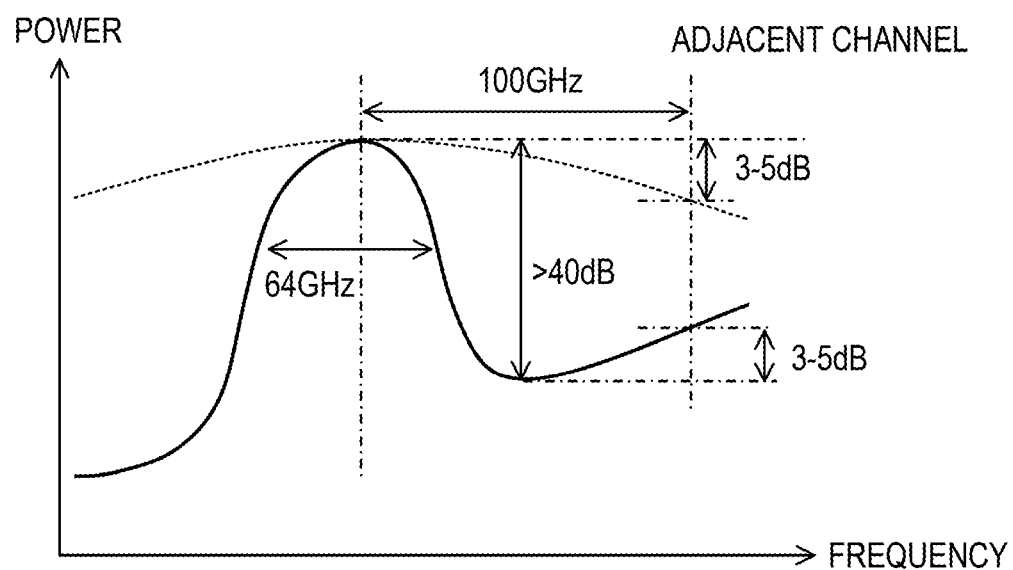
FIG. 12 is a graph showing an insertion loss characteristic of a conventional wavelength tunable filter together with the frequency spectrum of the input light.

FIG. 12 shows a frequency spectrum of light in the 400 Gbps/wavelength WDM network in a solid line on a graph comprising the horizontal axis representing the frequency. The 400 Gbps signal that has been multi-level modulated at 64 Gbound as an optical signal occupies almost the same bandwidth of 64 GHz on the frequency axis. When this signal is amplified by the optical amplifier 10 and transmitted, the ASE noise is added, degrading a signal-to-noise ratio of an optical signal (WDM signal) in the adjacent channel.

When the input light corresponding to the optical signal with the ASE noise added is filtered by a wavelength tunable filter in which the insertion loss curve follows the Gaussian function, the noise component near the adjacent channel that is 100 GHz away can be reduced by 40 dB or more relative to the signal component using a pass bandwidth $BW_3$ of less than 100 GHz. The dashed line shown in FIG. 12 corresponds to the insertion loss curve defined by the Gaussian function.

However, even if the ASE noise is attenuated by such a wavelength tunable filter, the ASE noise exists to a degree that cannot be ignored. If the pass bandwidth $BW_3$ is narrowed in order to attenuate the ASE noise, the insertion loss of the signal component increases.

Thus, in this embodiment, the wavelength tunable filter 30 is designed to exhibit the insertion loss curve following the super Gaussian function of order n=1 in the first wavelength band. The first wavelength band corresponds to a passband in which the insertion loss is up to −3 dB around the center frequency fc having the insertion loss of 0 dB.

The wavelength tunable filter 30 is further designed to exhibit the insertion loss curve following the super Gaussian function of order n=5 in the second wavelength band. The second wavelength band corresponds to wavelength bands that are away from the center frequency fc and adjacent to the first wavelength band with the first wavelength band interposed therebetween, and that have the insertion loss larger than −3 dB. That is, the reflectance distribution of the reflective surface 39A of the reflecting mirror 39 is set so that the wavelength tunable filter 30 has the insertion loss characteristics in accordance with the above-described insertion loss curve.

According to the bandpass filter-type wavelength tunable filter 30 exhibiting the insertion loss characteristics in which the insertion loss curve follows the super Gaussian function of different orders in the first wavelength band and the second wavelength band, the slope of the insertion loss is steeper than the curve following the Gaussian function and/or the super Gaussian function of a smaller order n in the second wavelength band.

Figure 7:
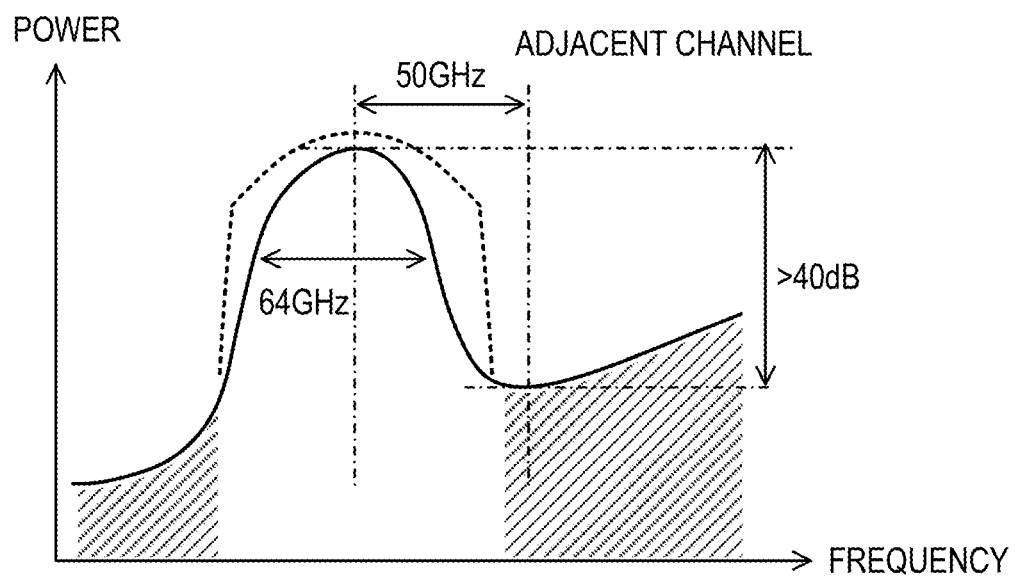
FIG. 7 is a graph showing the insertion loss characteristics of the wavelength tunable filter together with a frequency spectrum of an input light.

Therefore, this wavelength tunable filter 30 makes it possible to efficiently attenuate the ASE noise affecting the adjacent channel while reducing the insertion loss in the passband. That is, according to this embodiment, the noise components in the hatched area in FIG. 7 can be more effectively attenuated than before. The dashed line shown in FIG. 7 corresponds to the insertion loss curve of the wavelength tunable filter 30.

As in the case of this embodiment, when the first wavelength band is defined by the super Gaussian function of order n=1, it is possible to accurately control the passband to align the center of the passband with the center wavelength of the optical signal based on the power measured by the power monitor 60 compared to the case where the first wavelength band is defined by the super Gaussian function of higher order n as in the second wavelength band.

As mentioned earlier, the insertion loss curve following the super Gaussian function of order n<3 is relatively convex near the center frequency fc of the passband, but the insertion loss curve following the super Gaussian function of order n≥3 is relatively flat near the center frequency fc.

When the wavelength tunable filter 30 exhibits the flat insertion loss curve near the center frequency fc, even if the controller 70 attempts to adjust the angle of the mirror surface 40A of the tilting mirror 40 so that the power measured by the power monitor 60 shows a peak (i.e., a maximum value), this adjustment cannot be done accurately.

This is because in the insertion loss characteristic that exhibits a flat curve near the center frequency fc, even if the center of the passband is shifted from the center wavelength of the optical signal, no noticeable change occurs in the measured power. Even if an attempt is made to slide the passband to observe a change in the measured power, as shown in FIG. 8, almost no change is observed when the insertion loss curve near the center frequency fc follows the super Gaussian function of order n≥4.

Figure 8:
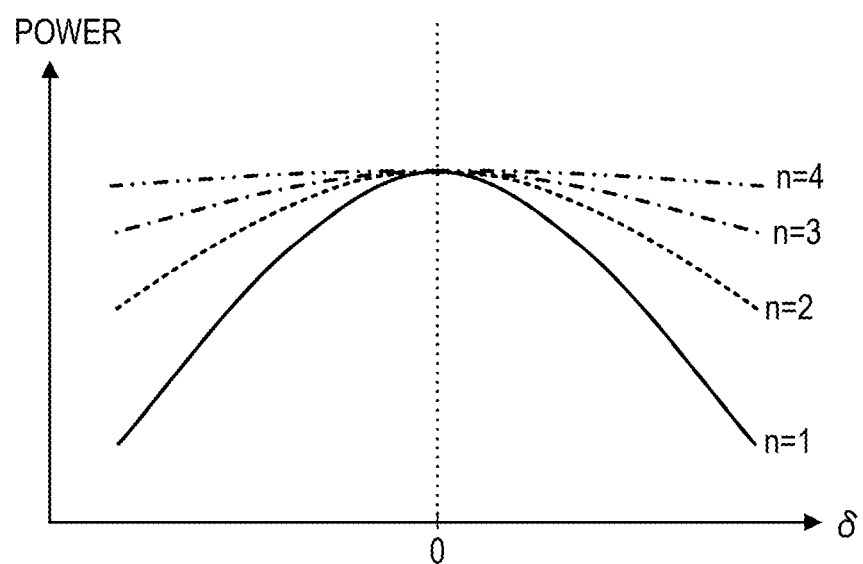
FIG. 8 is a graph showing a change in power measured by a power monitor when a passband is changed.

FIG. 8 shows a graph comprising a horizontal axis representing deviation δ and a vertical axis representing power measured by the power monitor 60. This graph shows changes in the measured power relative to the deviation δ when the insertion loss curve near the center frequency fc follows the super Gaussian function of order n=1, 2, 3, or 4. The deviation δ is a deviation of the center frequency of the passband from the center frequency of the optical signal on the frequency axis.

The graph shows that when the order n is equal to or less than 3, the change in the power exhibits a convex shape around the deviation δ=0. However, even if the order n is 3, it is practically difficult to perform the control to align the center of the passband with the center wavelength of the optical signal by accurately observing the peak of the measured power.

Thus, in this embodiment, the order n of the super Gaussian function in the first wavelength band is set to 1. In another example, the wavelength tunable filter 30 may be designed to exhibit the insertion loss curve following the super Gaussian function of order 1 or more and less than 3 in the first wavelength band and exhibits the insertion loss curve following the super Gaussian function of order 3 or more in the second wavelength band.

The wavelength tunable filter 30 may be designed to exhibit, in the first wavelength band, a Gaussian function having a peak at a center frequency fc or to exhibit the insertion loss curve following the convex function defined by the super Gaussian function of order 1 or more and less than 3. The wavelength tunable filter 30 may be designed so that the insertion loss curve in the second wavelength band shows a steeper slope than a slope in the second wavelength band of the convex function corresponding to the insertion loss curve in the first wavelength band. Such a design may similarly provide the wavelength tunable filter 30 with the insertion loss characteristics suitable for reducing the ASE noise and controlling the passband.

(2) First Variation

The optical transmission system 1 of a first variation is configured basically in the same way as the main embodiment, except that the first variation comprises a reflecting mirror 391 different from that of the main embodiment.

Figure 9:
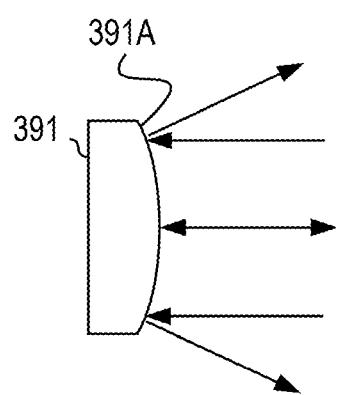
FIG. 9 illustrates a configuration of a reflecting mirror in a first variation.

That is, in the configuration of the wavelength tunable filter 30 of the first variation, the reflecting mirror 39 in the wavelength tunable filter 30 of the main embodiment is replaced with the reflecting mirror 391 having different features. In the following description, the configuration of the reflecting mirror 391 is selectively described with reference to FIG. 9, and the description of other parts configured in the same way as the main embodiment is omitted.

The reflecting mirror 391 of this variation is different from the reflecting mirror 39 of the main embodiment in that the reflecting mirror 391 comprises a curved reflective surface 391A and the curved reflective surface 391A has uniform reflectance. This reflecting mirror 391 is arranged in the same way as the main embodiment, so that the center of the reflective surface 391A is positioned on the optical axis passing through the center of the lens 37 and the normal line from the center of the reflective surface 391A is aligned with the optical axis.

Due to the telecentric optical system configured upstream of the reflective surface 391A, the multiple wavelength components included in the input light dispersed by the transmission grating 35 are propagated to a reflective surface 391A side as rays parallel to the optical axis.

The reflective surface 391A is a convex reflective surface with a vertex in the center thereof. Therefore, among the wavelength components corresponding to the passband, a wavelength component that is more spatially away from the center of the passband is incident on an area of the reflective surface 391A whose normal line is more angled from the optical axis. The wavelength component corresponding to the center wavelength of the passband is incident on the vertex of the reflective surface 391A.

Similarly to the main embodiment, according to the wavelength tunable filter 30 of the first variation, among the light reflected by the reflecting mirror 391, the light travelling in parallel with the optical axis is optically coupled to the output optical fiber 315. The wavelength component that is incident on the reflective surface 391A and that is output as the output light has an optical coupling rate to the optical fiber 315, and the optical coupling rate decreases as the wavelength component is shifted from the center of the passband. This is because the wavelength component shifted from the center of the passband is likely to be incident on an area of the reflective surface 391A where an angle formed by the optical axis and the normal line is larger. The decrease in the optical coupling rate corresponds to an increase in the insertion loss.

That is, in this variation, the reflective surface 391A comprises a curvature on purpose, which provides the wavelength tunable filter 30 with the insertion loss characteristics shown in FIG. 5 as in the main embodiment. In other words, the reflective surface 391A is shaped so that the wavelength tunable filter 30 exhibits the insertion loss characteristics shown in FIG. 5.

The first variation also provides the wavelength tunable filter 30 with the insertion loss characteristics similar to the main embodiment. Therefore, the optical transmission system 1 can effectively reduce the ASE noise, and furthermore, accurately control the alignment of the center of the passband with the center wavelength of the optical signal.

(3) Second Variation

The optical transmission system 1 of a second variation is configured basically in the same way as the main embodiment, except that the second variation comprises a lens 371 and a reflecting mirror 393 different from those of the main embodiment.

Figure 10:
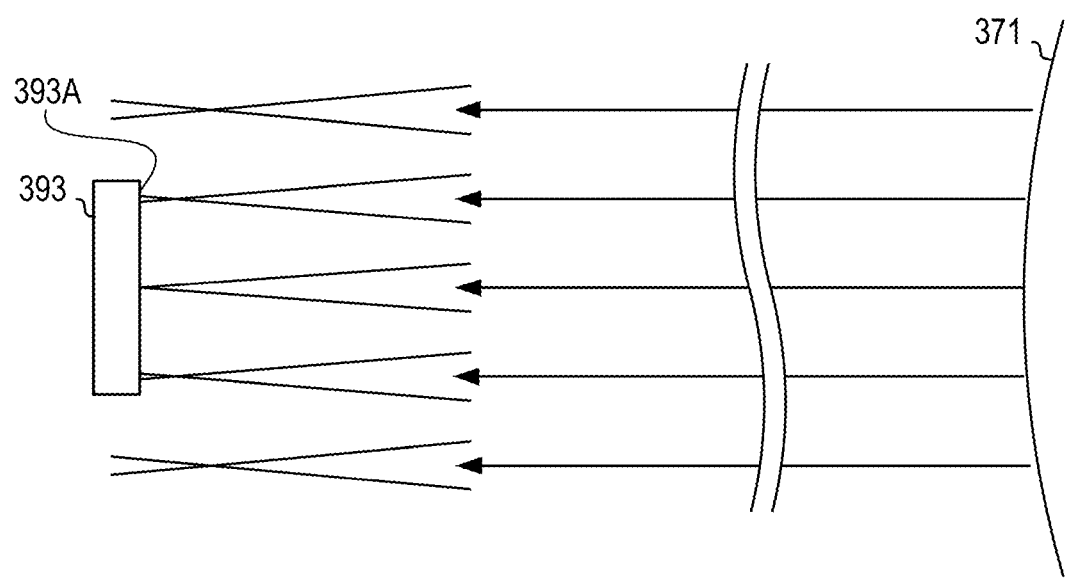
FIG. 10 is an explanatory diagram showing focus positions of a lens in a second variation.

That is, in the configuration of the wavelength tunable filter 30 of the second variation, the lens 37 and the reflecting mirror 39 in the wavelength tunable filter 30 of the main embodiment are replaced with the lens 371 and the reflecting mirror 393 having different features. In the following description, the features of the lens 371 and the reflecting mirror 393 are selectively described with reference to FIG. 10, and the description of other parts configured in the same way as the main embodiment is omitted.

The reflecting mirror 393 of this variation has a flat reflective surface 393A. The reflective surface 393A has a uniform reflectance throughout its entirety. The reflecting mirror 393 is arranged so that the center of the reflective surface 393 is located on the optical axis passing through the center of the lens 371, and that the normal line from the center of the reflective surface 393A aligns with the optical axis.

The lens 371 is designed to convert the multiple wavelength components dispersed and included in the transmitted diffraction light from the transmission grating 35 into rays parallel to the optical axis passing through the center of the lens 371. The lens 371 is furthermore designed so that the wavelength component passing through the center of the lens 371 and corresponding to the center wavelength of the passband are focused in the center of the reflective surface 393A. Note that the lens 371 is designed to have different focal distances at respective positions located away from the center in the direction of the wavelength dispersion.

That is, the lens 371 is designed to generate a spherical aberration in which a wavelength component passing through an area more away from the center of the lens 371 in the direction of the wavelength dispersion, i.e., a wavelength component in a wavelength band more away from the center wavelength of the passband has a focus position more away from the reflective surface 393A in a direction of the normal line of the reflective surface 393A.

In this design, by use of the spherical aberration of the lens 371, the wavelength tunable filter 30 of this variation is designed so that the wavelength components incident on the reflective surface 393A in the area more away from the center of the reflective surface 393A in the direction of the wavelength dispersion have larger insertion loss. Specifically, the lens 371 is designed so that the insertion loss curve is matched with the insertion loss curve shown in FIG. 5 as in the main embodiment.

Therefore, also in the second variation, the optical transmission system 1 can effectively reduce the ASE noise, and furthermore, accurately control the alignment of the center of the passband with the center wavelength of the optical signal.

(4) Third Variation

The optical transmission system 1 of a third variation is configured in the same way as the second variation except for a lens 373 different from that of the second variation.

Figure 11:
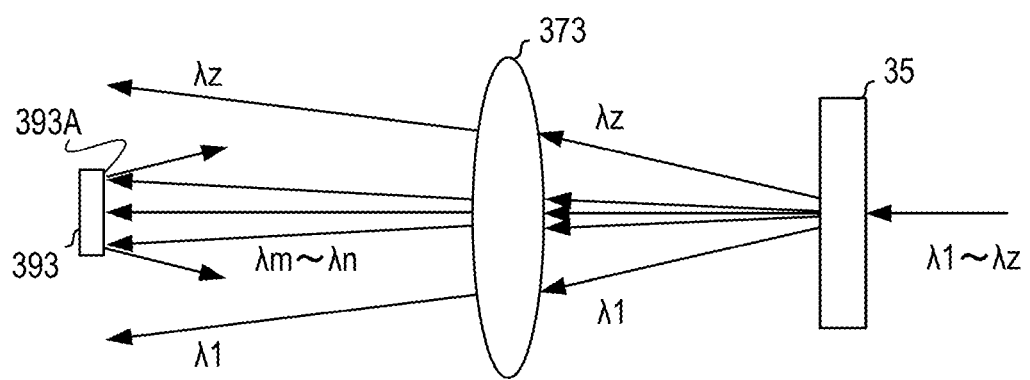
FIG. 11 is an explanatory diagram showing directions of propagation of light passed through a lens in a third variation.

That is, in the configuration of the wavelength tunable filter 30 of the third variation, the lens 371 in the wavelength tunable filter 30 of the second variation is replaced with the lens 373 having different features. In the following description, the feature of the lens 373 of the third variation is selectively described with reference to FIG. 11, and the description of other parts configured in the same way as the second variation is omitted.

Similarly to the second variation, the wavelength tunable filter 30 of this variation comprises the reflecting mirror 393 having the flat reflective surface 393A with the uniform reflectance. The reflective surface 393A is arranged so that the center thereof is located on the optical axis passing through the center of the lens 373.

The lens 373 is designed to generate a spherical aberration in which a wavelength component passing through the lens 373 in an area more away from the center of the lens 373 in the direction of the wavelength dispersion, i.e. a wavelength component in a passband more away from the center wavelength is more inclined relative to the optical axis passing through the center of the lens 373.

In this design, by use of the spherical aberration of the lens 373, the wavelength tunable filter 30 of this variation is designed so that the wavelength components incident on the reflective surface 393A in the area more away from the center of the reflective surface 393A in the direction of the wavelength dispersion have a lower optical coupling rate relative to the optical fiber 315 and larger insertion loss. Specifically, the lens 373 is designed so that the insertion loss curve is matched with the insertion loss curve shown in FIG. 5 as in the case of the main embodiment.

Therefore, also in the third variation, the optical transmission system 1 can effectively reduce the ASE noise, and furthermore, accurately control the alignment of the center of the passband with the center wavelength of the optical signal.

[Others]

Some exemplary embodiments including the variations of the present disclosure have been discussed above; however, the present disclosure is not limited to the above-described exemplary embodiments, and may be embodied in various forms. For example, the technology of the present disclosure is applicable to wavelength tunable filters of various types, and the configuration of the wavelength tunable filter 30 is not limited to the above-described embodiments.

In the technology of the present disclosure, the passband of the wavelength tunable filter 30 is controlled based on the power of the light corresponding to the output light. According to the above-described embodiments, the power of the light corresponding to the output light is power of the output light itself.

However, the power of the light corresponding to the output light may take any form if the power relates to the output light. For example, it may be power of the light obtained by removing the output light from the input light. In this case, in order to align the center of the passband with the center wavelength of the optical signal, the angle of the mirror surface 40A of the tilting mirror 40 can be controlled so that the power of the light other than the output light is minimized.

A plurality of functions of one element of the aforementioned embodiments may be provided to a plurality of elements. A plurality of functions of a plurality of elements may be integrated into one element. A part of the configurations of the aforementioned embodiments may be omitted. At least part of the configurations of the aforementioned embodiments may be added to or replaced with the configurations of other above-described embodiments. It should be noted that all modes included in the technical idea specified from the wording described in the claims are embodiments of the present disclosure.

The invention claimed is:

1. An optical transmission system comprising:
   an optical filter configured to selectively pass, as an output light, at least one wavelength component of multiple wavelength components included in an input light, the optical filter comprising a movable element to change a passband; and
   a controller configured to adjust the passband by controlling the movable element based on power of light corresponding to the output light measured by a power monitor,
   wherein the optical filter is configured as a bandpass filter having a first amplitude-frequency characteristic in a first wavelength band and having a second amplitude-frequency characteristic in a second wavelength band,
   wherein the first wavelength band includes a center wavelength of the passband,
   wherein the second wavelength band is adjacent to the first wavelength band and is more away from the center wavelength than the first wavelength band,
   wherein in the first wavelength band, the first amplitude-frequency characteristic is that a gain curve corresponds to a convex function defined by a Gaussian function or a super Gaussian function and having a peak at the center wavelength, and
   wherein in the second wavelength band, the second amplitude-frequency characteristic is that the gain curve shows a steeper slope than the convex function.

2. The optical transmission system according to claim 1, wherein the controller is configured to control the movable element so that the center wavelength of the passband is adjusted to a center wavelength of a signal component included in the input light by controlling the movable element so that the power shows a peak.

3. The optical transmission system according to claim 2, wherein in the first wavelength band, the first amplitude-frequency characteristic is that the gain curve corresponds to the Gaussian function or a super Gaussian function of order 1 or more and less than 3, and
   wherein in the second wavelength band, the second amplitude-frequency characteristic is that the gain curve corresponds to a super Gaussian function of order 3 or more.

4. The optical transmission system according to claim 3, wherein the optical filter comprises, in addition to the movable element, a transmission grating arranged in a propagation path of the input light and a reflecting mirror having a reflective surface and configured to reflect, as the output light, wavelength components incident on the reflective surface under a given angular condition among dispersed multiple wavelength components of the input light included in transmitted diffraction light from the transmission grating, and wherein the movable element is configured to change the passband by changing propagation paths of the dispersed multiple wavelength components relative to the reflective surface under a control of the controller.

5. The optical transmission system according to claim 4, wherein the movable element is a tilting mirror, and wherein the tilting mirror is configured to change wavelength components to be incident on the reflective surface of the reflecting mirror among the dispersed multiple wavelength components by changing an angle of a mirror surface to reflect the transmitted diffraction light from the transmission grating toward the reflecting mirror.

6. The optical transmission system according to claim 4, wherein between the reflecting mirror and the transmission grating, a telecentric optical system is arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis, and wherein the reflective surface includes a reflective surface that has a convex shape with a vertex at a point on which a wavelength component corresponding to the center wavelength of the passband is incident and that is shaped so that the optical filter has the first amplitude-frequency characteristic and the second amplitude-frequency characteristic.

7. The optical transmission system according to claim 2, wherein the optical filter comprises, in addition to the movable element, a transmission grating arranged in a propagation path of the input light and a reflecting mirror having a reflective surface and configured to reflect, as the output light, wavelength components incident on the reflective surface under a given angular condition among dispersed multiple wavelength components of the input light included in transmitted diffraction light from the transmission grating, and wherein the movable element is configured to change the passband by changing propagation paths of the dispersed multiple wavelength components relative to the reflective surface under a control of the controller.

8. The optical transmission system according to claim 7, wherein the movable element is a tilting mirror, and wherein the tilting mirror is configured to change wavelength components to be incident on the reflective surface of the reflecting mirror among the dispersed multiple wavelength components by changing an angle of a mirror surface to reflect the transmitted diffraction light from the transmission grating toward the reflecting mirror.

9. The optical transmission system according to claim 7, wherein between the reflecting mirror and the transmission grating, a telecentric optical system is arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis, and wherein the reflective surface includes a reflective surface that has a convex shape with a vertex at a point on which a wavelength component corresponding to the center wavelength of the passband is incident and that is shaped so that the optical filter has the first amplitude-frequency characteristic and the second amplitude-frequency characteristic.

10. The optical transmission system according to claim 1, wherein in the first wavelength band, the first amplitude-frequency characteristic is that the gain curve corresponds to the Gaussian function or a super Gaussian function of order 1 or more and less than 3, and wherein in the second wavelength band, the second amplitude-frequency characteristic is that the gain curve corresponds to a super Gaussian function of order 3 or more.

11. The optical transmission system according to claim 10, wherein the optical filter comprises, in addition to the movable element, a transmission grating arranged in a propagation path of the input light and a reflecting mirror having a reflective surface and configured to reflect, as the output light, wavelength components incident on the reflective surface under a given angular condition among dispersed multiple wavelength components of the input light included in transmitted diffraction light from the transmission grating, and wherein the movable element is configured to change the passband by changing propagation paths of the dispersed multiple wavelength components relative to the reflective surface under a control of the controller.

12. The optical transmission system according to claim 11, wherein the movable element is a tilting mirror, and wherein the tilting mirror is configured to change wavelength components to be incident on the reflective surface of the reflecting mirror among the dispersed multiple wavelength components by changing an angle of a mirror surface to reflect the transmitted diffraction light from the transmission grating toward the reflecting mirror.

13. The optical transmission system according to claim 11, wherein between the reflecting mirror and the transmission grating, a telecentric optical system is arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis, and wherein the reflective surface includes a reflective surface that has a convex shape with a vertex at a point on which a wavelength component corresponding to the center wavelength of the passband is incident and that is shaped so that the optical filter has the first amplitude-frequency characteristic and the second amplitude-frequency characteristic.

14. The optical transmission system according to claim 1, wherein the optical filter comprises, in addition to the movable element,
- a transmission grating arranged in a propagation path of the input light and
- a reflecting mirror having a reflective surface and configured to reflect, as the output light, wavelength components incident on the reflective surface under a given angular condition among dispersed multiple wavelength components of the input light included in transmitted diffraction light from the transmission grating, and
- wherein the movable element is configured to change the passband by changing propagation paths of the dispersed multiple wavelength components relative to the reflective surface under a control of the controller.

15. The optical transmission system according to claim 14,
- wherein the movable element is a tilting mirror, and
- wherein the tilting mirror is configured to change wavelength components to be incident on the reflective surface of the reflecting mirror among the dispersed multiple wavelength components by changing an angle of a mirror surface to reflect the transmitted diffraction light from the transmission grating toward the reflecting mirror.

16. The optical transmission system according to claim 14,
- wherein between the reflecting mirror and the transmission grating, a telecentric optical system is arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis, and
- wherein the reflective surface includes a reflective surface that has a convex shape with a vertex at a point on which a wavelength component corresponding to the center wavelength of the passband is incident and that is shaped so that the optical filter has the first amplitude-frequency characteristic and the second amplitude-frequency characteristic.

17. The optical transmission system according to claim 14,
- wherein between the reflecting mirror and the transmission grating, a telecentric optical system is arranged, the telecentric optical system comprising at least a lens to adjust a direction of propagation of each of the dispersed multiple wavelength components included in the transmitted diffraction light propagated from the transmission grating toward the reflecting mirror so that the direction of propagation is parallel to an optical axis, and
- wherein the reflective surface includes a reflective surface whose reflectance distribution is characterized so that the optical filter has the first amplitude-frequency characteristic and the second amplitude-frequency characteristic.

18. The optical transmission system according to claim 14,
- wherein between the reflecting mirror and the transmission grating, a lens is arranged to adjust a direction of propagation of each of the multiple wavelength components included in the transmitted diffraction light propagated from the transmission grating toward the reflecting mirror, and
- wherein the lens is arranged to generate an aberration in which a direction of propagation of a wavelength component in a wavelength band more away from the center wavelength of the passband is more inclined relative to an optical axis so that the optical filter has the first amplitude-frequency characteristic and the second amplitude-frequency characteristic.

19. The optical transmission system according to claim 14,
- wherein between the reflecting mirror and the transmission grating, a lens is arranged to adjust a focal distance of each of the multiple wavelength components included in the transmitted diffraction light propagated from the transmission grating toward the reflecting mirror, and
- wherein the lens is arranged to generate an aberration in which a wavelength component in a wavelength band more away from the center wavelength of the passband has a focal point more away from the reflective surface so that the optical filter has the first amplitude-frequency characteristic and the second amplitude-frequency characteristic.

* * * * *